(12) United States Patent
Duncan

(10) Patent No.: US 6,408,565 B1
(45) Date of Patent: Jun. 25, 2002

(54) FISH BAIT DEVICE

(76) Inventor: Franklin R. Duncan, E. 11205 4th Ave., Spokane, WA (US) 99206

( * ) Notice: Subject to any disclaimer, the term of this patent is extended or adjusted under 35 U.S.C. 154(b) by 0 days.

(21) Appl. No.: 09/523,009

(22) Filed: Mar. 10, 2000

(51) Int. Cl.[7] ............................................. A01K 85/100
(52) U.S. Cl. ..................................................... 43/42.06
(58) Field of Search .......................... 43/42.06, 42.15, 43/42.22, 42.39

(56) References Cited

U.S. PATENT DOCUMENTS

| | | | |
|---|---|---|---|
| 1,442,332 A | * | 1/1923 | Frament ..................... 43/42.15 |
| 1,441,059 A | | 2/1923 | Brown |
| 1,786,568 A | * | 12/1930 | Kutz ........................... 43/42.15 |
| 2,069,972 A | * | 2/1937 | Schroeder ................. 43/42.15 |
| 2,229,239 A | | 1/1941 | Davis |
| 2,303,097 A | * | 11/1942 | Townsend et al. ......... 43/42.15 |
| 2,317,781 A | * | 4/1943 | Lehto ......................... 43/42.06 |
| 2,387,255 A | | 10/1945 | Godlewski |
| 2,523,536 A | * | 9/1950 | Maddux ..................... 43/42.15 |
| 2,535,392 A | * | 12/1950 | Dale ........................... 43/42.06 |
| 2,600,437 A | | 6/1952 | Siepe |
| 2,674,060 A | * | 4/1954 | Simmons .................... 43/42.15 |
| 2,794,287 A | * | 6/1957 | Mancusi ..................... 43/42.06 |
| 3,535,814 A | | 10/1970 | O'Brien |
| 4,231,179 A | | 11/1980 | Hillesland |
| 4,442,622 A | * | 4/1984 | Sartain ........................... 43/35 |
| 4,835,897 A | | 6/1989 | Rudolph |
| 5,172,510 A | * | 12/1992 | Lovell, Jr. .................. 43/42.36 |
| 5,276,992 A | * | 1/1994 | Kato ........................... 43/42.06 |

FOREIGN PATENT DOCUMENTS

GB    1160339    6/1967

* cited by examiner

Primary Examiner—Kurt Rowan
(74) Attorney, Agent, or Firm—Reidlaw, L.L.C.; John S. Reid (57) ABSTRACT

A fish bait device has a substantially three-dimensional front portion having the appearance of at least the head of a given animal, and a substantially three-dimensional rear portion having the appearance of at least the tail or abdomen of the given animal. The front portion is pivotally connected to the rear portion, and together, the front and rear portions form an integral fish bait device which exhibits a realistic appearance and movement of an actual live bait. The front portion generally has a duct that directs a stream of liquid medium toward a deflecting surface on the rear portion. The deflecting surface deflects the stream causing the front and rear portions to swivel, or wiggle, relative to one another in a realistic movement of an actual live bait.

1 Claim, 5 Drawing Sheets

FISH BAIT DEVICE

FIELD OF THE INVENTION

The present invention relates to a fish bait device and more specifically to an articulated integral fish bait device.

BACKGROUND OF THE INVENTION

In general, fish bait devices are used by sport fishers to attract and capture predatory fish such as, for example, trout fish or bass fish which prey on smaller animals. Usually, a fish bait device is attached to the end of a cord, such as a fishing line, and placed on or into a body of water the predatory fish are known to inhabit. Such fish bait devices usually have one or more barbed fish hooks attached thereon. Theoretically, the predatory fish is tricked into perceiving the artificial fish bait device as actual live prey when, in fact, it is not. The predatory fish is then captured when it attempts to swallow the fish bait device, whereupon the mouth of the predatory fish is impaled by the fish hook attached to the fish bait device. In this manner the predatory fish is eventually captured by reeling in the fishing line.

In an attempt to make fish bait devices as effective as possible, the designers of such devices usually configure them so as to generate signals which are supposedly perceptible and attractive to the predatory fish. These signals are usually visual, and are in the form of motion produced by the artificial bait device. The predominant theory of prior art artificial fish bait devices seems to be that an exceptionally strong visual signal is preferable.

Therefore, most prior art artificial fish bait devices are capable of generating vigorous visual signals in the form of strong movements and vibrant colors or reflective surfaces. Because the prior art devices are configured to generate strong visual signals, the appearance and movement of the prior art devices are exaggerated and lack realism relative to an actual live bait.

Because sport fishing is fairly prevalent in some habitations of predatory fish, and because a great percentage of sport fishers practice a "catch-and-release" policy, some of the more mature predatory fish can be captured and released several, if not many, times. Thus, some of the more mature predatory fish can learn to distinguish the exaggerated movement and unrealistic appearance of prior art fish bait devices from actual live bait. This can result in difficulty in attracting and capturing mature predatory fish which are better able to distinguish, through experience, actual live prey from the artificial bait devices due to the unrealistic appearance and movement of such devices. Also, this behavior by more mature fish of avoiding artificial bait devices can be learned from example by less mature fish. Additionally, by generating only visual signals, the effective range of prior art bait devices is limited as far as attracting predatory fish since, generally, the visual range is much less than, for example, the audible or vibratory range in most habitations of predatory fish.

Typical examples of prior art fish bait devices are shown in U.S. Pat. Nos. 2,229,239, 2,600,437, 3,535,814, and 4,231,179. All of the fish bait devices disclosed in these patents have first portions that are pivotally connected to second portions. U.S. Pat. No. 2,229,239 to Davis shows fish bait device with a tubular first portion and a flat, substantially two-dimensional second portion that is pivotally connected to the tubular first portion. As can be seen, the shape of the fish bait device disclosed by the '239 patent to Davis bears little resemblance to an actual live bait. Similarly, U.S. Pat. No. 2,600,437 to Siepe shows a substantially tubular first portion and a relatively short, flat, two-dimensional second portion that is pivotally connected to the tubular first portion. Like the fish bait device of the '239 patent, the shape of the fish bait device disclosed by the '437 patent to Siepe bears little resemblance to an actual live bait.

Like the '239 and '437 patents, U.S. Pat. No. 3,535,814 to O'Brien also shows a fish bait device having a tubular first portion and a second portion pivotally connected to the first portion. The fish bait device of the '814 patent differs slightly from those of the Davis and Siepe patents, however, in that the tubular first portion of the '814 fish bait device tapers to a flattened slot section on one end. Also, the '814 fish bait device differs in that the second portion of the '814 patent is made up of a fish hook with a feather fly attached to it as opposed to the flat, two dimensional second portion of the Davis and Siepe patents. The fish bait device of the '814 patent is similar to those of the '239 and '437 patents in that the '814 patent discloses a fish bait device having a shape which bears little resemblance to an actual live bait.

The fish bait device shown in U.S. Pat. No. 4,231,179 to Hillesland also has a first portion that is pivotally connected to a second portion. As in the '239, '437, and '814 patents, the fish bait device disclosed by the '170 patent also has a tubular first portion. The second portion of the fish bait device shown by the '170 patent is a flat, thin, soft, pliable plastic "worm" that is pivotally connected to the first portion by way of a fish hook. The "worm" tail portion alone of the '170 patent may have somewhat of a realistic appearance, although actual worms are rarely flat and thin. However, when the tubular first portion is connected to the "worm" second portion as taught by the '170 patent, the shape and appearance of the '170 device as a whole bears little resemblance to an actual live bait.

British Patent No. 1,116,339 to Wintersberger shows a fish bait device having a tapered, tubular first portion and a fish hook that is pivotally connected to the first portion. In several embodiments of the '339 device, relatively small tail flaps are mounted on the fish hook. A spinning motion of the '339 device is produced by turbine like blades attached both on the outer surface and within the tubular first portion. This spinning motion is the predominant movement of the '339 device. Although the device shown in the '339 patent appears to be shaped so as to resemble an unspecified aquatic animal, the exaggerated spinning movement of the '339 device bears little resemblance to the movement of an actual live bait.

As discussed above, most prior art devices do not have realistic appearances or movements. A prior art artificial bait device shown in U.S. Pat. No. 1,441,059 to Brown has somewhat of a realistic appearance. However, the fish bait device disclosed by the '059 patent incorporates a relatively complex mechanism to generate movement. This can lead to problems created by fouling of the mechanism by debris and corrosion.

Therefore it has long been known that it would be desirable to provide a fish bait device which achieves the benefits to be derived from similar prior art devices, but which avoids the shortcomings and detriments individually associated therewith.

SUMMARY OF THE INVENTION

The present invention provides for a fish bait device configured for use in a liquid medium. The fish bait device comprises a front portion having a first end and an opposite second end, and a rear portion having a first end and an opposite second end. The first end of the rear portion is pivotally connected to the second end of the front portion such that the front and rear portions together form an integral fish bait device. Both the front and rear portions of the present invention are substantially three-dimensional and shaped such that, when the device is viewed as a whole, the device has the realistic appearance of an integral live bait. The present invention uses a simple pivot connection between the front and rear portions which, together with its deflecting surface, allows realistic movement of the device which is imparted by the relative motion of the surrounding liquid medium.

The invention further includes a fish bait device as described above wherein the front portion defines a duct for directing a stream of the liquid medium against the first end of the rear portion. The first end of the rear portion includes at least one deflecting surface that is presented to at least a portion of the stream of liquid medium directed by the duct. The impact of the stream of liquid medium against the deflecting surface causes the front and rear portions to oscillate relative to one another such that the fish bait device gives the impression of an actual live, swimming bait.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

The invention generally includes a fish bait device having an articulated, integral, two-piece body. By articulated, I mean that the fish bait device has a front and a rear portion which make up the body and which are connected so as to pivot relative to one another at the connection. By integral, I mean that the front and rear portions when viewed together are configured to give the appearance of a single unit or entity. In other words, if viewed separately, each of the front and rear portions would have a substantially unmistakable appearance of discontinuity.

The rear portion generally has at least one deflecting surface proximal to the front portion. The front portion generally has a duct that directs a stream of liquid medium against the deflecting surface which, in turn, deflects the stream. The deflection of the liquid stream induces turbulent flow areas in the liquid medium which cause the front and rear portions of the fish bait device to oscillate relative to one another in a realistic swimming motion.

Figure 1:
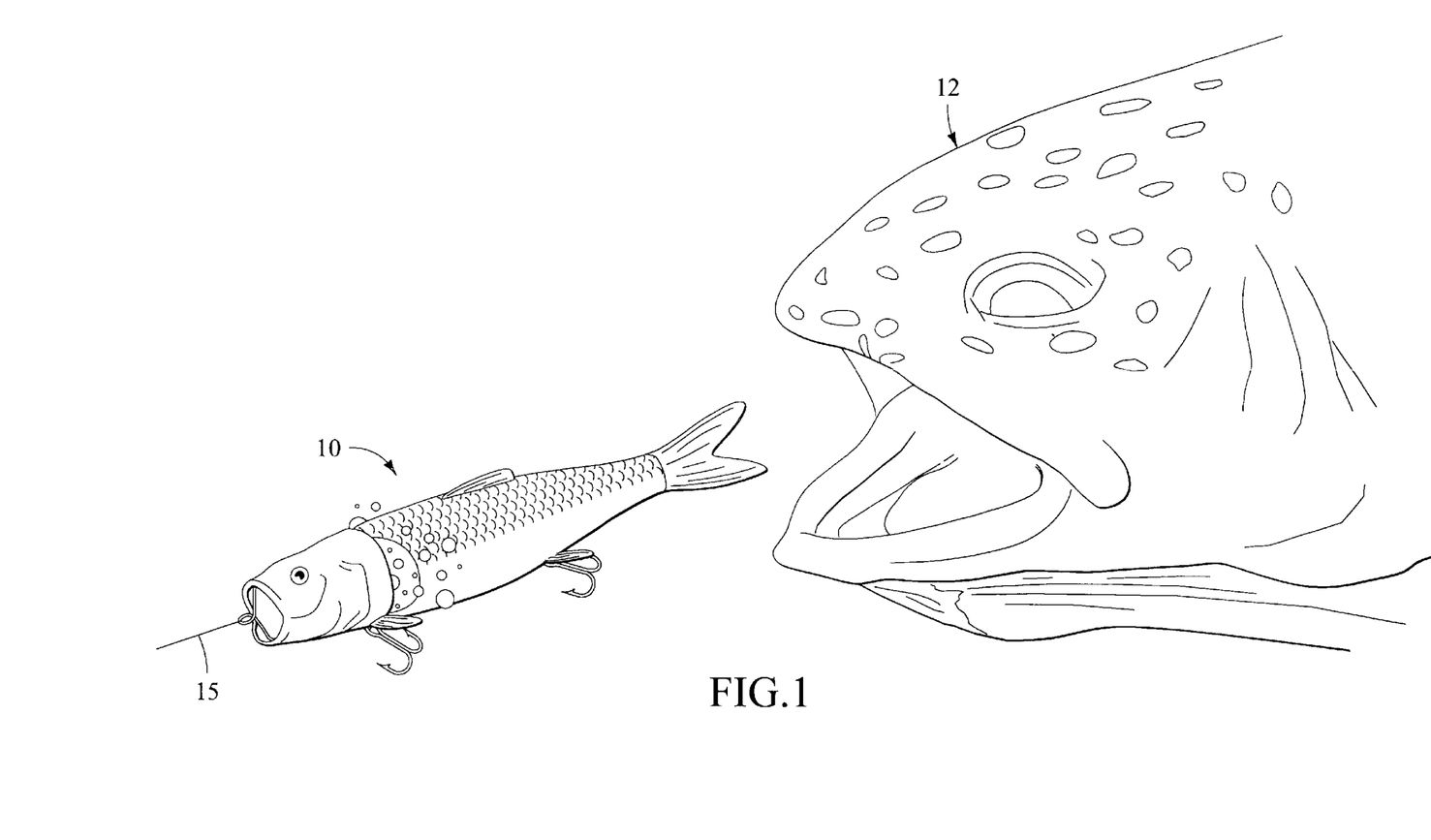
FIG. 1 is an environmental view of a fish bait device in accordance with one embodiment of the present invention in which the device is configured to substantially resemble a fish.

A device in accordance with the present invention is shown FIG. 1, and is generally indicated by the numeral 10. The device 10 is configured for use in a liquid medium (not shown) such as, for example, fresh water of a lake or river for capturing predatory fish 12. The device 10 can be used in other liquid mediums such as, for example, sea water. As indicated by FIG. 1, to facilitate its use, the device 10 can be connected to a cord 15 such as, for example, a fishing line. The cord 15 can be controlled by the user of the device with the aid of a rod-and-reel (not shown).

Figure 2:
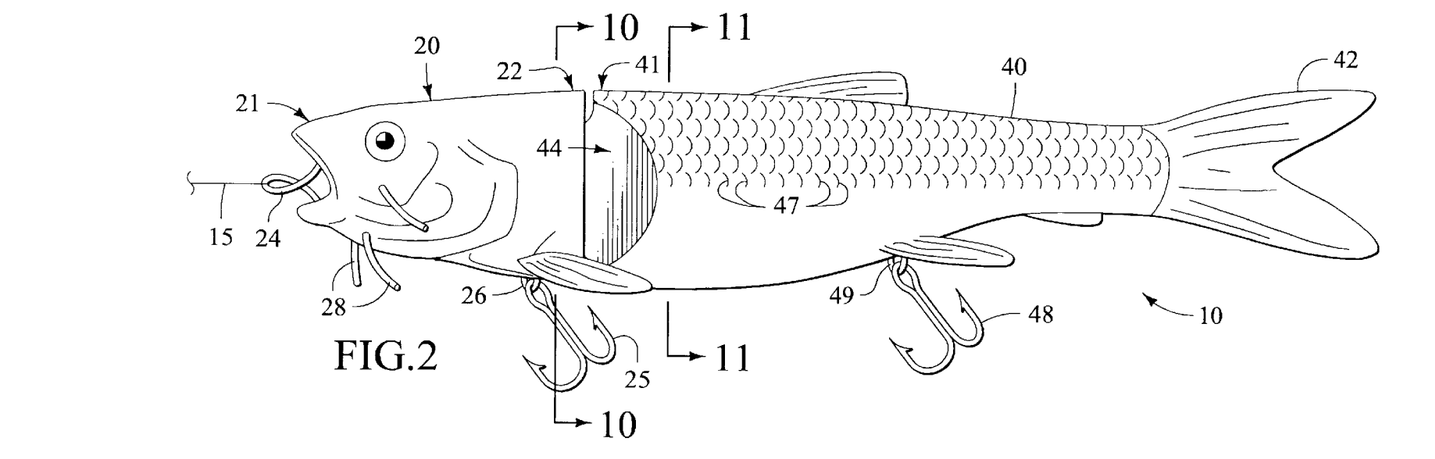
FIG. 2 is a side view of the fish bait device shown in FIG. 1.
Figures 12, 13:
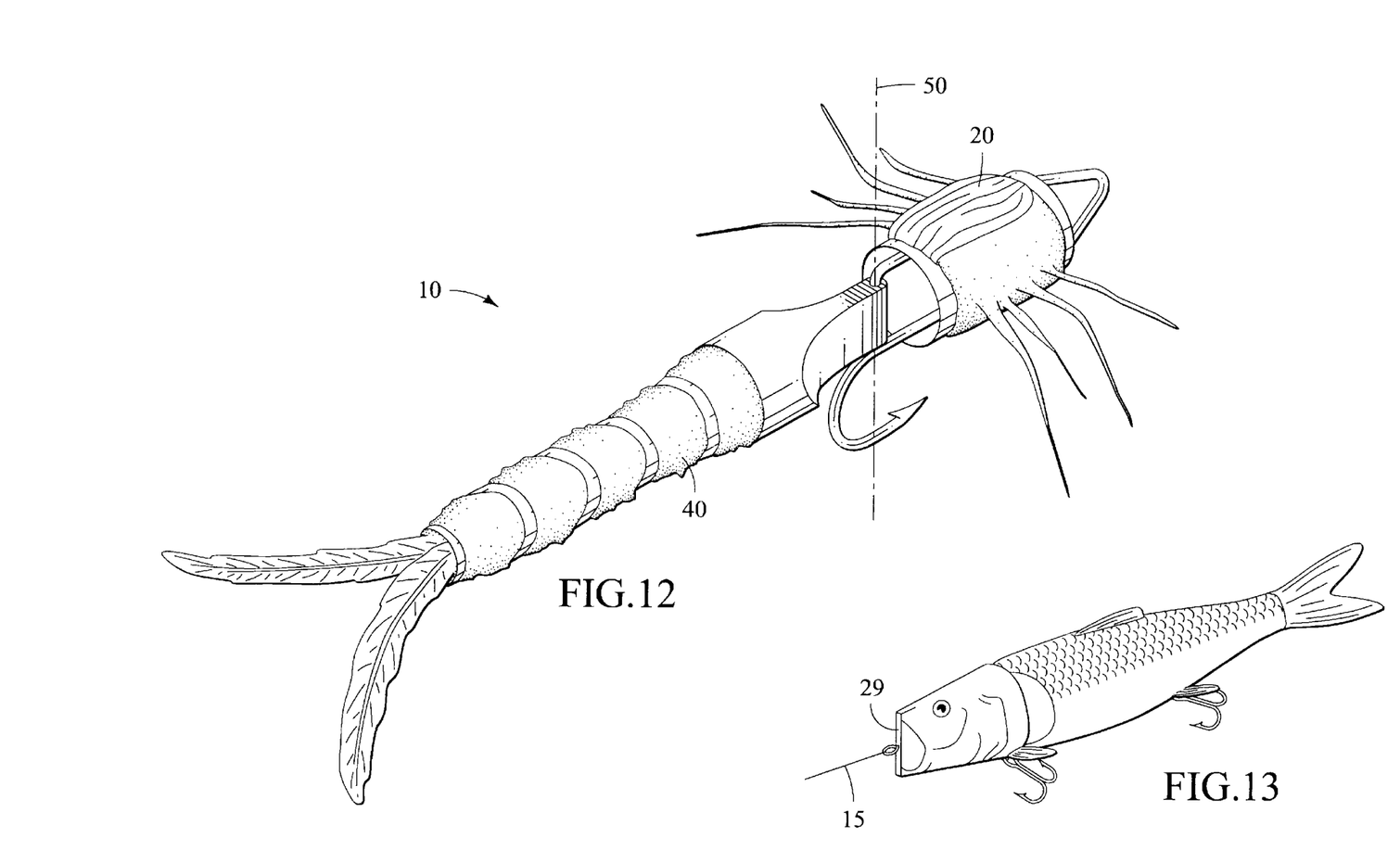
FIG. 12 is a perspective view of an alternative embodiment of a fish bait device in accordance with the present invention in which the device is configured so as to substantially resemble an insect.
FIG. 13 is a side view of the fish bait device shown in FIG. 1 in accordance with an alternative embodiment thereof.

Referring now to FIG. 2, the device 10 comprises a substantially three-dimensional front portion 20 which has a first end 21 and an opposite second end 22. The front portion 20 can be comprised of substantially rigid material such as, for example, styrene plastic, or the like. Also, in accordance with an alternative embodiment of the present invention, the front portion 20 can be constructed from semi rigid, or flexible, material such as, for example, any number of different types of urethane, or the like. The front portion 20 can substantially resemble at least the head of a given animal such as, for example, a fish as shown in FIG. 2. Alternatively, in accordance with another embodiment of the invention, the front portion 20 of the device 10 can substantially resemble at least the head of another type of animal such as, for example, a crustacean (not shown) or an insect as shown in FIG. 12. As further shown in FIG. 2, the front portion 20 can be configured for the attachment of a cord or fishing line 15 thereto by providing an attachment point such as, for example, a cord eyelet 24 which can be mounted on the first end 21 of the front portion 20 as shown in FIG. 2. Furthermore, the front portion 20 can be configured for the attachment of a fish hook 25 thereto by providing an attachment point such as, for example, a hook eyelet 26 to the front portion 20 as shown in FIG. 2.

Figure 3:
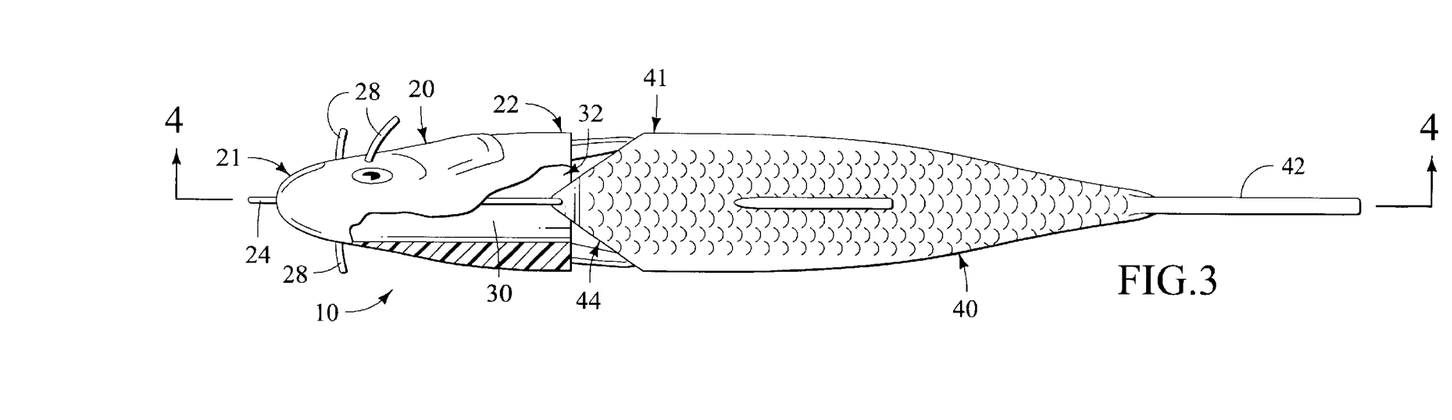
FIG. 3 is a top view of the fish bait device shown in FIG. 2 with a partial cutaway of the front portion showing the duct which is internal thereto.

A device 10 in accordance with an alternative embodiment of the present invention can include a plurality of flexible drag-initiators 28 which extend outwardly from the front portion 20 as shown in FIGS. 2 and 3. These drag-initiators can serve to add realism to the device 10 by appearing to be, for example, "whiskers" or "feelers" of a particular animal. In addition, these drag-initiators can serve to produce motion-resistant force, or drag, which can be beneficial in producing desirable animated movement of the device 10. For example, the drag-initiators can impart movement to the front portion 20 of the lure 10 independently of the rear portion 40, giving the lure the attitude of a small injured fish, making it a more attractive target for a fish.

Figure 4:
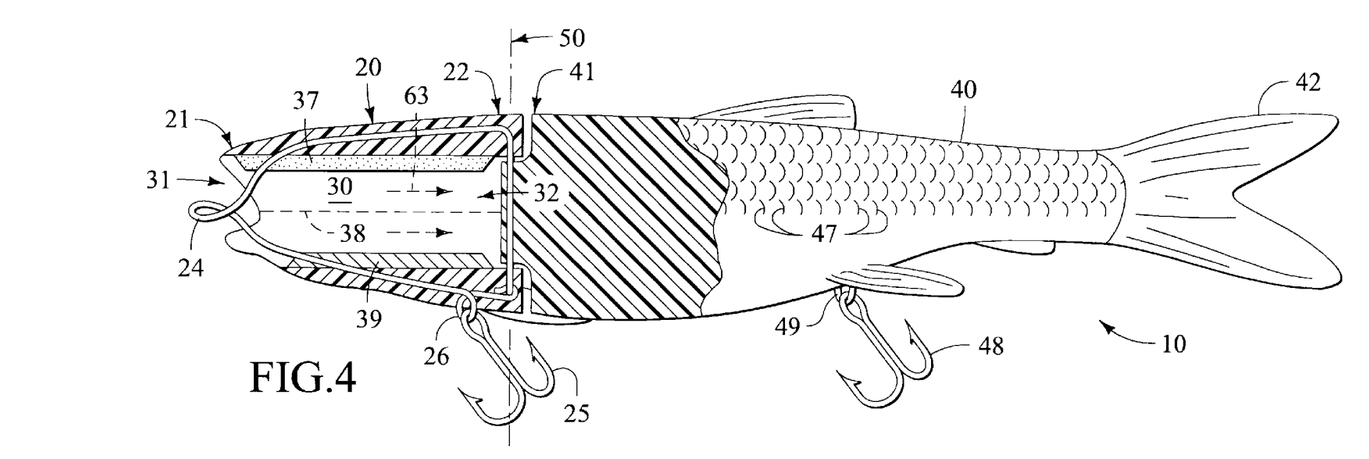
FIG. 4 is a longitudinal sectional side view of the fish bait device shown in FIG. 3 with a full section of the front portion and a partial section of the rear portion showing the duct which is internal to the front portion.

Now referring to FIGS. 3 and 4, the front portion 20 of the device 10 can define a substantially longitudinal duct 30 which is substantially internal to the front portion 20. As shown in FIG. 4, the duct 30 has an inlet opening 31 which is substantially near the first end 21 of the front portion 20. Furthermore, the duct 30 also has an outlet opening 32 which is substantially near the second end 22 of the front portion 20. As can be seen from a study of FIG. 4, the inlet opening 31 and the outlet opening 32 can be configured to be substantially the same size.

In accordance with an alternative embodiment, the device 10 can be configured such that the inlet opening 31 and the outlet opening 32 are of differing sizes such as, for example, wherein the outlet opening can smaller than the inlet opening. This can provide for an increase in velocity of the fluid exiting the outlet opening 32. Since the fluid exiting the outlet opening 32 impinges on the front 41 of the rear portion 40, a greater force concentration can be achieved by using a smaller outlet opening. Moreover, a device 10 in accordance with still another embodiment of the present invention can have a solid front portion 20 without a duct 30, while otherwise being configured in a manner which is substantially similar to that of the apparatus described herein and shown in the accompanying figures.

Now referring to FIG. 2, it can be seen that the device 10 also comprises a substantially three-dimensional rear portion 40 which has a first end 41 and an opposite second end 42. The rear portion 40 can be comprised of substantially rigid material such as, for example, styrene plastic, or the like. Also, in accordance with an alternative embodiment of the present invention, the rear portion 40 can be constructed from semi rigid, or flexible, material such as, for example, any number of different types of urethane, or the like. The rear portion 40 can substantially resemble at least the tail of a given animal such as, for example, a fish as shown in FIG. 2. Alternatively, in accordance with another embodiment of the present invention the rear portion 40 can be configured to substantially resemble at least the tail or abdomen of another animal such as, for example, a crustacean (not shown), or an insect as shown in FIG. 12. As further shown in FIGS. 2 and 3, the rear portion 40 of the device 10 can have at least one deflecting surface 44 near the first end 41 thereof.

Now referring to FIGS. 2 and 3, the first end 41 of the rear portion 40 is pivotally connected to the second end 22 of the front portion 20 such the device 10 can have the appearance of an integral live aquatic animal such as, for example, a small fish as shown in FIGS. 1 and 2. The device 10 can have substantially authentic surface markings 47 which further contribute to the substantially realistic overall appearance of the device 10. The rear portion 40 can be configured for the attachment of a fish hook 48 thereto by providing an attachment point such as, for example, a hook eyelet 49 to the rear portion 40 as shown in FIG. 2. A further study of FIGS. 2 and 3 reveals that the rear portion 40 is at least as long as the front portion 20 and can be substantially longer than the front portion 20.

Now referring to FIG. 4, the front portion 20 and rear portion 40 can be connected together as discussed above by utilizing a pivot axis 50 such as, for example, a hinge joint. The pivot axis 50 can be configured in a number of different orientations with respect to the front and rear portions 20, 40 such as, for example, vertically as shown in FIG. 2. A vertical orientation of the pivot axis 50 is preferable in attaining a realistic side-to-side wiggling movement of the front portion 20 with respect to the rear portion 40 when the device 10 is configured to substantially resemble a fish which propels itself using similar movement.

In accordance with an alternative embodiment of the present invention, the pivot axis 50 can have a different orientation such as, for example, horizontally (not shown) with respect to the front and rear portions 20, 40. A horizontal orientation of the pivot axis 50 is preferable in attaining a realistic up-and-down wiggling movement of the front portion 20 with respect to the rear portion 40 when the device 10 is configured to substantially resemble an animal such as, for example, a crustacean which propels itself using similar movement.

Still referring to FIG. 4, a device 10 in accordance with an alternative embodiment of the present invention can include a floatation device 37 which is eccentrically attached to the device 10 as shown. Similarly, such a device can include a weight 39 which is eccentrically attached to the device 10 and which located substantially opposite of the location of the floatation device 37. The floatation device 37 and weight 39 can be attached to the device 10 in various orientations depending on the specific result desired. For example, the floatation device 37 can be attached to the device 10 proximal to the upper region of the duct 30 as shown. Likewise, the weight 39 can be attached to the device 10 proximal to the lower region of the duct 30, opposite the floatation device. This orientation of the floatation device and the weight, as shown, can tend to keep the device 10 in a relatively upright orientation in the fluid medium. This helps to further contribute to a realistic appearance of the lure, since most bait, such as small fish and the like, swim in the water with a particular orientation. Preferably, the floatation device 37 is made of a material that is substantially less dense than the fluid medium, such as Styrofoam or cork. Conversely, the weight 39 is preferably made of a material that is substantially more dense than the fluid medium. such as lead or brass.

Figure 10:
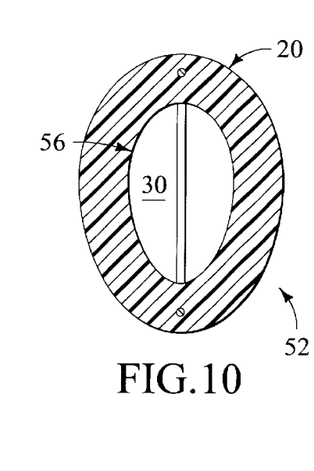
FIG. 10 is a lateral sectional view of the front portion of the fish bait device shown in FIG. 2.
Figure 11:
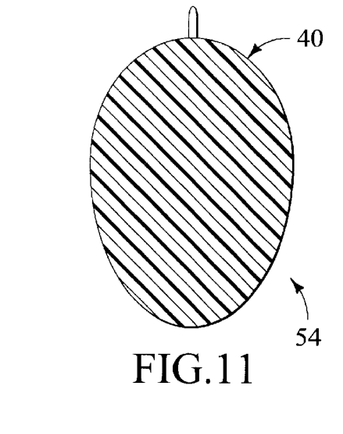
FIG. 11 is a lateral sectional view of the second portion of the fish bait device shown in FIG. 2.

Now referring to FIG. 10, the front portion 20 has a cross-section 52 proximate the second end 22 thereof. Likewise, the rear portion 40 has a cross-section 54 proximate the first end 41 of the second portion 40. The cross-sections 52, 54 of the front and rear portions 20, 40 respectively, preferably have substantially similar shape and size which promotes continuity in the integral appearance of the apparatus 10. FIG. 10 also reveals that the duct 30 has a given cross-section 56 proximate the outlet opening 32 thereof. The cross-section 54 of the rear portion 40 can be at least approximately equal to the given cross-section of the duct 56.

Figure 5:
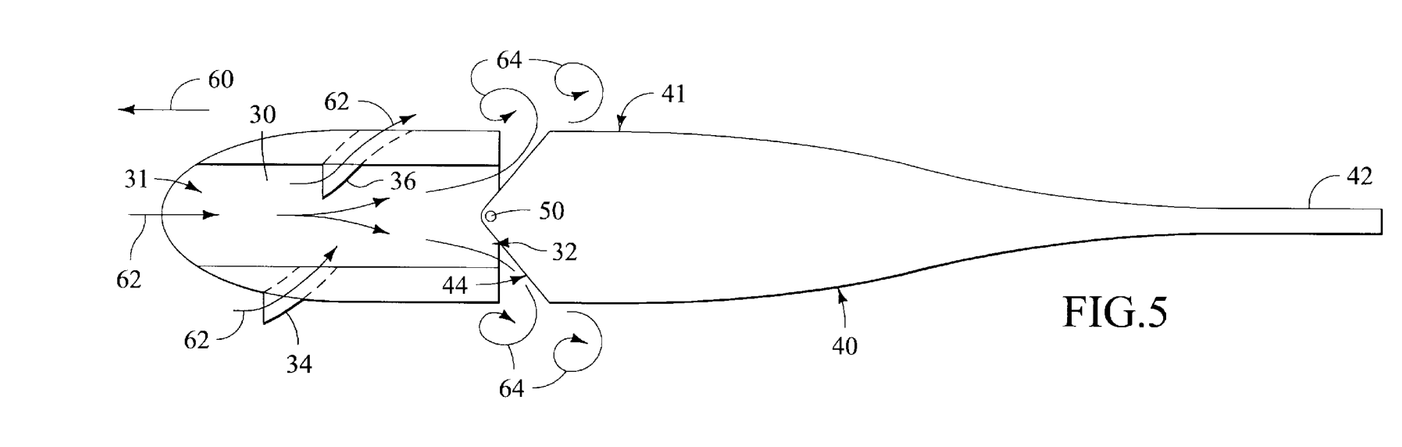
FIG. 5 is a diagrammatic top view of a fish bait device in accordance with the present invention showing the flow of the liquid stream through the duct, which is internal to the front portion, and the resulting turbulent flow areas.

Now referring to FIG. 5, the front and rear portions 20, 40 are adapted for movement relative to the fluid medium 12 in a substantially longitudinal direction which is indicated by numeral 60. The duct 30 is configured to take in a stream 62 of liquid medium at the inlet opening 31 of the duct 30. The duct 30 directs the stream 62 out of the second end 22 of the front portion 20 through the outlet opening 32 of the duct 30. Further study of FIG. 5 reveals that the deflecting surface 44 is proximal to the outlet opening 32. The orientation of the duct 30 relative to the deflecting surface 44 is such that the stream 62 is directed against the deflecting surface 44 when the device 10 moves in the direction 60 relative to surrounding liquid medium.

Still referring to FIG. 5, in accordance with an alternative embodiment of the present invention, the front portion 20 can include a plurality of apertures defined therein. The apertures can be configured in the form of an intake 34 which can serve to direct a portion of the fluid medium into the duct 30 downstream of the duct inlet opening 31. Alternatively, the apertures can be configured in the form of an exhaust 36 which serves to direct a portion of the fluid stream 62 out of the duct upstream of the duct outlet opening 32. Through the use of such side mounted ducts and fluid exhaust ports forces can be applied to the front portion 30 of the device, adding realism to the motion of the device as it is pulled through the water. Further, by downwardly-directing an exhaust port, the device can achieve the effect of a bottom dwelling creature, such as a small crab or shrimp, by kicking up sediment clouds. In accordance with a still further alternative embodiment of the present invention, the duct 30 can be segmented using internal dividers 38 as shown in FIGS. 4 and 5. The internal dividers 38 serve to segment the duct 30 so as to form a plurality of discreet fluid stream segments 63 which make up the fluid stream 62. Segmenting the duct 30 can serve to direct portions of the fluid stream 62 in an advantageous manner. In this manner different motion attributes can be imparted to the device, further contributing to the realistic effect as it moves through the water.

As shown in FIG. 5, the deflecting surface 44 deflects the stream 62 as the stream 62 exits the outlet opening 32 of the duct 30. The deflection of the stream 62 by the deflecting surface 44 induces at least one turbulent flow area generally indicated by the numeral 64. Preferably, the turbulent flow area 64 is substantially laterally offset relative from the pivot axis 50. The turbulent flow area 64 provides a buffeting action which causes the front and rear portions 20, 40 to repeatedly swivel, or wiggle, with respect to one another from side to side, giving a realistic swimming movement thereto.

Figure 6:
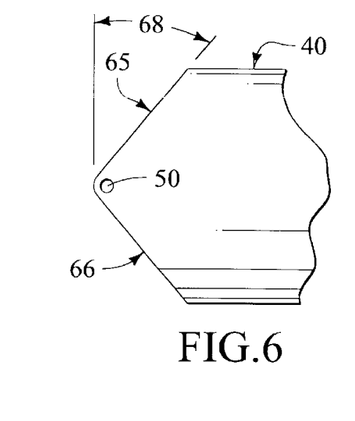
FIG. 6 is a partial top view of the rear portion of a fish bait device in accordance with one embodiment of the present invention showing both the first and second faces as flat.
Figure 7:
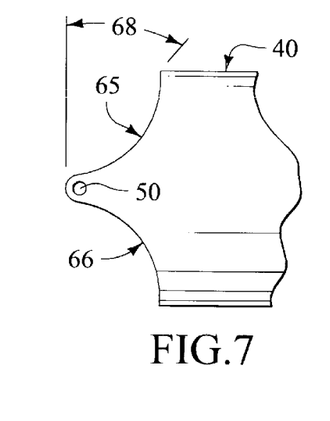
FIG. 7 is a partial top view of the rear portion of a fish bait device in accordance with another embodiment of the present invention showing both the first and second faces as arcuate.
Figure 8:
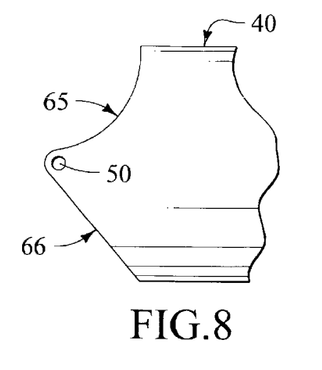
FIG. 8 is a partial top view of the rear portion of a fish bait device in accordance with yet another embodiment of the present invention showing the first face as flat and second face as arcuate.

Referring to FIGS. 6, 7, and 8, the deflecting surface can be bifurcated into a first face 65 and a second face 66. As further shown, the contour of the first and second faces 65, 66 can configured differently in each of the several embodiments shown. For example, each of the first and second faces 65, 66 can be substantially flat as in the embodiment shown in FIG. 6, or each can be substantially arcuate as in the embodiment shown in FIG. 7. Alternatively, the first face 65 can be substantially arcuate and the second face 66 can be substantially flat as in the embodiment shown in FIG. 8, or vice versa. A study of FIGS. 6 and 7 will reveal that an angle of incidence 68 is defined by each face 65, 66. The angle of incidence 68 represents the angular orientation of each face 65, 66 relative to the rear portion 40. The device 10 can be configured in different embodiments wherein each embodiment has a unique angular value of the angle of incidence 68. The angular value of the angle of incidence 68 can effect the frequency and amplitude of the swimming motion of the device 10 discussed above. Generally, lower angular values of the angle of incidence 68 will result in relatively more aggressive swimming movement of the device 10. Contrarily, higher angular values of the angle of incidence 68 will result in relatively less aggressive swimming movement of the device 10.

Figure 9:
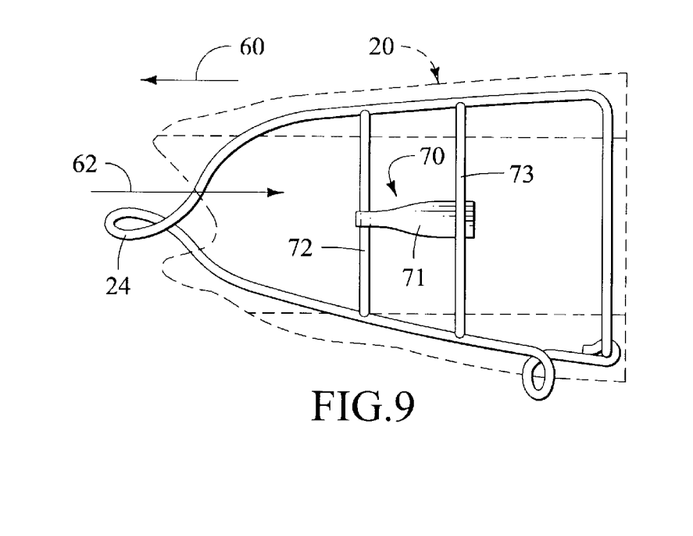
FIG. 9 is a phantom side view of the front portion of a fish bait device in accordance with one embodiment of the present invention showing the internal noisemaker.

Referring now to FIGS. 1 and 9, the device 10 can include an internal noisemaker generally indicated by the numeral 70. While I will use the expression "noisemaker" herein, it is understood noisemaker essentially creates vibrations which can be transmitted in the medium in which the device 10 is being used. These vibrations, while not necessarily in the human audible range, can be detected by fish. The noisemaker 70 is configured to generate an acoustical signal which is detectable by a given predatory fish 12 and which is configured to be actuated by impingement of the liquid medium against the noisemaker 70. The noisemaker 70 can be comprised of an arm 71 pivotally connected to the front portion 20 by way of a pivot bar 72 and a member 73 mounted on the front portion 20. As the stream 62 moves through the duct 30, the stream impinges on the arm 71 causing the arm 71 to oscillate relative to the member 73. The arm 71 can be shaped so as to effect the vigorousness and frequency of its movement. The oscillation of the arm 71 causes the arm 71 to repeatedly strike the member 73 which generates an acoustical signal detectable by a given predatory fish 12 and attracting the predatory fish 12 within visual range of the device 10, whereupon the predatory fish 12 is further attracted to the device 10 visually, and is captured when trying to swallow the device 10.

As discussed above, the fish bait device 10 can be configured in one of a number of different embodiments to facilitate its use in a specific manner. For example, the device 10 can be configured to substantially resemble a fish as discussed above and shown in FIGS. 2, 3, and 4. This embodiment can be used, for example, in the manner of a trolling lure. To facilitate the use of the device 10 as a trolling lure, the device 10 can be configured to have a relative neutral buoyancy. This can be accomplished by constructing the device 10 from materials that have a density substantially similar to that of the liquid medium in which the device 10 is to be used.

In another embodiment the device 10 can be configured so as to facilitate its use in the manner of a fly-fishing lure. To facilitate such use, the device 10 can be configured to resemble an animal other than a fish such as, for example, an insect as shown in FIG. 12. As can be seen in FIG. 12, the front portion 20 and the rear portion 40 of the device 10 are pivotally connected about and axis 50. Together, the front and rear portions 20, 40 substantially resemble an integral, live insect. As a fly-fishing lure such an embodiment of the device 10 can be configured to have a relative positive buoyancy so as to enable the device 10 to float at or near the surface of a body of water, or the like (not shown). This can be accomplished by constructing the device 10 of materials that have a density less than that of the liquid medium in which the device 10 is used.

In still another embodiment, the device 10 can be configured to substantially resemble a crustacean. This embodiment can facilitate use of the device 10 in a manner so as to capture predatory fish which prey on crustaceans. To facilitate such a use, the device 10 can be configured to have a relatively negative buoyancy so as to enable the device 10 to sink to the bottom of a river or the like in order to closely resemble such animals which inhabit such environments. This can be accomplished by constructing the device 10 from materials that have a density greater than that of the liquid medium in which the device 10 is to be used.

Further embodiments of the device 10 in accordance with the present invention can be created by configuring the device 10 in one of several relative sizes. For example, a relatively large device 10 can be used beneficially as a trolling lure. Similarly, a relatively medium-sized device 10 can be used beneficially as a casting lure. Likewise, a relatively small device 10 can be used beneficially as a fly-fishing lure.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fish-bait device for use in a fluid medium, the device comprising:

an articulated integral two-piece body comprising:

a substantially three-dimensional front portion having a first end and an opposite second end, wherein the front portion defines a substantially longitudinal duct therein;

a substantially three-dimensional rear portion having a first end, and an opposite second end, wherein the first end of the rear portion is pivotally connected about a pivot axis to the second end of the front portion;

a fluid-deflecting surface defined on the rear portion proximate the first end thereof, wherein the duct is configured to direct there through a stream of fluid medium against the fluid-deflecting surface;

a floatation device attached to the front portion and eccentrically located substantially within the duct at a given orientation; and, a weight attached to the front portion and eccentrically located substantially within the duct at a given orientation which is substantially opposite the floatation device.

* * * * *